May 24, 1966  L. J. MOELLER  3,252,239
FISHING REEL
Filed July 16, 1964  2 Sheets-Sheet 1
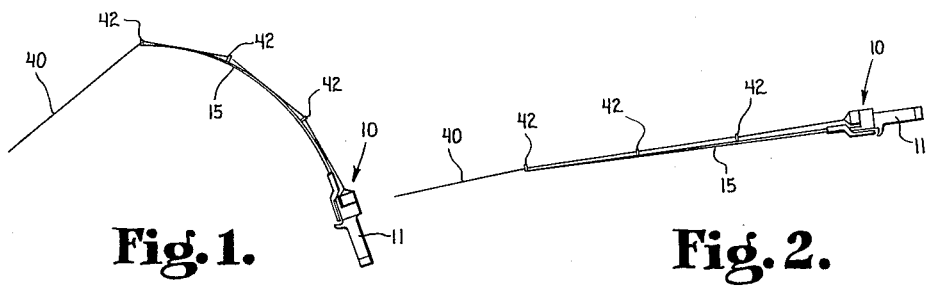
Fig. 1.   Fig. 2.
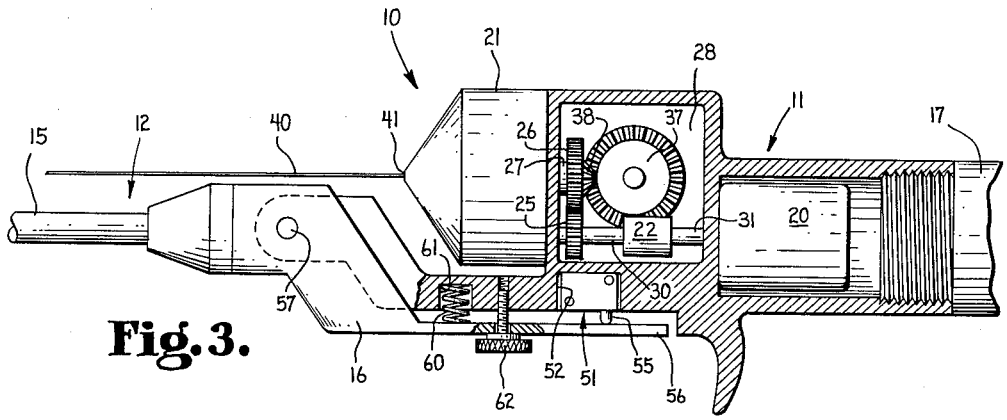
Fig. 3.
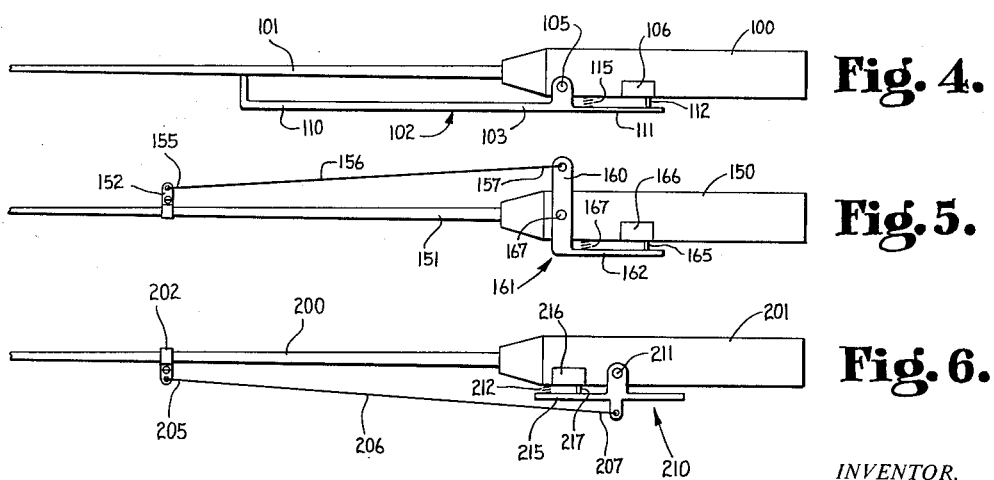
Fig. 4.
Fig. 5.
Fig. 6.
INVENTOR.
LOWELL J. MOELLER
BY
Lockwood, Woodard, Smith & Weikart
Attorneys May 24, 1966     L. J. MOELLER     3,252,239
FISHING REEL Filed July 16, 1964     2 Sheets-Sheet 2

*INVENTOR.*
LOWELL J. MOELLER
BY
*Lockwood, Woodard, Smith & Weikart*
Attorneys

United States Patent Office 3,252,239
Patented May 24, 1966

3,252,239
FISHING REEL
Lowell J. Moeller, 6823 E. Pleasant Run Parkway
Indianapolis, Ind.
Filed July 16, 1964, Ser. No. 383,077
9 Claims. (Cl. 43—21)

The present invention relates to a fishing reel arrangement and more particularly to a power driven fishing reel arrangement and also to a method of fishing.

One object of the present invention is to provide an improved fishing reel arrangement.

Another object of the present invention is to provide an improved method of fishing.

The prior art contains a number of different types of powered or motor driven fishing reels. Such prior art reels require relatively large sized motor and batteries because the reels are constructed to operate in such a way as to pit the motor force or torque directly against the force of the fish. One object of the present invention is to provide a fishing reel arrangement constructed in such a way that the force exerted by the fish is not directly pitted against the motor force whereby the motor and the batteries powering the motor can be relatively small and light.

A general object of the present invention is to provide a reel arrangement which relieves fatigue normally resulting from hand cranking of the reel when retrieving a fish, when reeling in a free line after casting, and when drawing a lure through or on the water to attract a fish.

Still another object of the present invention is to provide a powered reel arrangement which does not require the use of or the learning of new skills by the fisherman.

Related objects and advantages will become apparent as the description proceeds.

One embodiment of the present invention might include a fishing reel arrangement comprising a handle and a rod mounted on the handle. A reel is mounted on the handle and is driven by an electric motor also mounted on the handle. Switch means are provided for controlling power to the motor. There is further provided means for sensing the bending of the fishing rod and for actuating the switch means to shut off the electric motor when the rod bends a predetermined amount.

The full nature of the invention will be understood from the accompanying drawings and the following description and claims.

FIG. 1 is a side elevation of a fishing reel arrangement embodying the present invention and illustrating the arrangement in operation.

FIG. 2 is a view similar to FIG. 1 showing the reel arrangement in a different operating position.

FIG. 3 is a side elevation of the reel arrangement of FIGS. 1 and 2 with portions broken away to illustrate the internal construction of the reel arrangement.

FIGS. 4, 5 and 6 are side elevations of alternative embodiments of the present invention.

Figure 7:
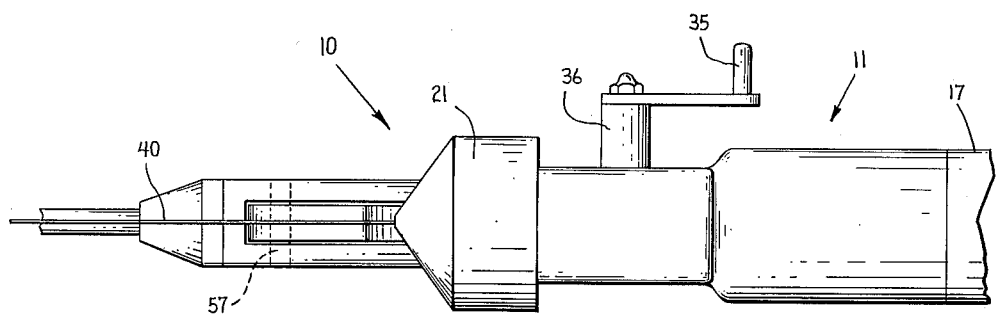
FIG. 7 is a top plan view of the structure illustrated in FIG. 3.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated what might be called a rod arrangement, a rod and reel arrangement or a reel arrangement 10 which includes a handle 11 and a rod 12 pivotally mounted upon the handle 11. The rod 12 includes the rod per se 15 and a rod support 16 upon which the rod per se 15 is fixedly mounted. Within the distal end 17 of the handle 11 are received batteries 18 (FIG. 8) which are suitably arranged to power a small electrical motor 20. The batteries 18 are the type used in flashlights, however, larger batteries connected to the reel by a flexible cable can be used when external longer life batteries are preferred. The motor is coupled to a conventional reel 21 by means of a one-way clutch 22 and spur gears 25 and 26 received within enclosure 28. The spur gear 26 is fixedly mounted upon a shaft 27 fixedly coupled to the reel while the spur gear 25 is fixedly mounted upon a shaft 30 forming the output shaft of the one-way clutch 22. The output shaft 31 of the electrical motor 20 is directly coupled to the input of the one-way clutch 22.

The reel 21 may be, for example, a conventional spinning type of reel, Model 303 Futura Spincast, manufactured by South Bend Tackle Company, Inc., of Chicago, Illinois. The motor 20, as mentioned, is also conventional and may be a relatively small and light electrical motor such as, for example, a miniature 1.5 volt D.C. motor, type F404, weighing only 2 ounces, manufactured by Tokyo Scientific Co., Ltd. of Tokyo, Japan. The one-way clutch 22 is so arranged as to directly couple the motor to the reel 21 for rotating the reel by the motor in one direction. The reel, however, is freely rotatable in said one direction without accompanying rotation of the motor because of the one-way clutch 22.

The crank 35 is rotatably mounted upon the handle 11 for rotation of the reel 21 by means of a one-way clutch 36 which directly couples the crank 35 to a bevel gear 37 received within the enclosure 28 in the handle 11. The spur gear 26 and shaft 27 have fixed relative thereto a further bevel gear 38 which meshes with the bevel gear 37 coupling the crank 35 to the reel. The one-way clutch 36, which may be identical to the one-way clutch 22, is arranged to positively couple the crank 35 to the reel 10 when the crank is used to drive the reel in said one direction. The one-way clutch 36 is also operable to block rotation of the reel 10 in a direction opposite to said one direction when the crank 35 is held against rotation relative to the handle. The one-way clutch 36 also permits rotation of the reel when it is driven in said one direction by the motor 20 whereby the crank 35 may be held or remain stationary. The clutch 22 and 36 may be, for example, a Helical Spring Clutch, manufactured by Marquette Metal Products Co. of Cleveland, Ohio.

Figure 8:
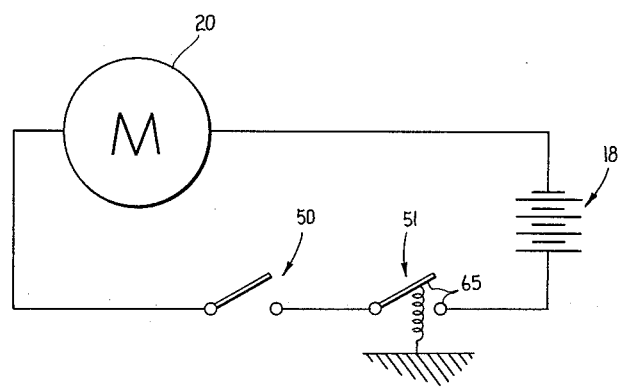
FIG. 8 is a schematic electrical diagram of the reel arrangement of the present invention.

A fishing line 40 is wound in conventional fashion upon the reel 21 and exits from an opening 41 coaxial with the reel housing configuration and is threaded through conventional loops 42 fixed to the rod 15. Referring to FIG. 8, the electrical circuit of the present device includes the battery or batteries 18 which are coupled in series with the motor 20 and with switches 50 and 51. The switch 50 is manually operable and may be provided at any desired point on the handle and may be locked in open or closed position by the fisherman. The switch 51 is a limit switch which is mounted within a suitable recess 52 in the handle and which has its actuating arm 55 projecting outwardly of the recess. Formed integrally with the rod support 16 is an arm 56 which is positioned to actuate the switch 51 upon pivoting of the rod support 16 about the axis 57. A compression spring 60 is received within a recess 61 in the handle 11 and bears against the arm 56 yieldably holding the arm 56 away from the actuating arm 55 of the switch and against a limit screw 62. The limit screw 62 is threadedly mounted upon the handle 11 and may be adjusted to vary the range of travel of pivoting of the rod support 16 and to take up slack. When the arm 56 is in engagement with the limit screw 62 and in the illustrated position of FIG. 3, the limit switch 51 is closed and contacts 65 are in engagement. When the rod support arm 56 swings against the actuating arm 55 of the switch, the contacts 65 are caused to open and the switch is open.

In order to operate the present device, the fisherman may cast a lure in conventional manner. The switch 51 is closed by the fisherman depressing the arm 56 with the finger or thumb so that the reel 21 is free to pay out the line 40. After the casting operation, the arm 56 is released and spring 60 moves it to the position of FIG. 3 thus energizing the motor 20 for reeling in the line. In order to reel in the line, the fisherman points the rod 15 toward the lure so that the line 40 and the rod 15 retain the position illustrated in FIG. 2. After the lure has been completely reeled in, the switch 51 can again be opened and the casting operation repeated.

Assuming that a fish bites on the lure, the fisherman can operate the rod in conventional manner to thoroughly sink the hook in the fish. This is normally done by pulling the rod up or swinging the rod in the hand toward or into the position illustrated in FIG. 1. When the rod is moved into the position of FIG. 1, the thumb or fingers may be used to hold the crank 35 thus preventing unreeling of the line 40. Alternatively, the reel may be equipped with an anti-reversing ratchet arrangement. Even though the switch 50 is closed, the line 40 is not reeled in because the bending of the rod 15, as shown in FIG. 1, causes the rod support 16 to pivot about the shaft 57 and causes the arm 56 to engage the actuating arm 55 and to open the contacts 65.

The landing of the fish and reeling in of the line is accomplished by first moving the rod into the position of FIG. 1 and then lowering the rod back toward the position of FIG. 2 and repeating this operation a number of times. In conventional unpowered operation of the rod, the crank 35 is rotated when the rod is swung down from the position of FIG. 1 to the position of FIG. 2. By the present invention, however, the swinging of the rod from the position of FIG. 1 toward the position of FIG. 2 allows the rod to straighten out and allows the spring 60 to push the arm 56 away from the switch 51 thus closing the contacts 65 and energizing the motor 20 to reel in the line 40. During the repeated raising and lowering of the rod, the fisherman merely holds or retains the crank 35 against rotation with his thumb or fingers (assuming the reel is not equipped with an anti-reversing ratchet arrangement) and thus has one hand free to land the fish.

As can be appreciated from the above description, the reason why the present invention can use a relatively light motor and relatively low power flashlight batteries for the motor is the fact that the motor is not used to forceably reel in the fish but instead is used to take up the slack in the line each time the rod is lowered from the position of FIG. 1 to the position of FIG. 2.

Referring to FIG. 4, an alternative embodiment of the invention is schematically illustrated and includes a handle 100 which may be similar to the handle 11. In FIGS. 4–6 the reel and the line for the reel is not illustrated but may be identical or similar to the reel 21. The rod 101 of FIG. 4 is directly mounted on the handle 100. The bending of the rod 101 is sensed by means 102 which includes a lever 103 pivoted on the handle 100 at 105. A limit switch 106 controls a motor driving the reel in the same manner as above described. The limit switch 106 is actuated by the lever 103 when the rod 101 bends downwardly forcing the lever arm 110 downwardly whereby the lever arm 111 depresses the actuating arm 112 of the limit switch 106. The spring 115 received between the handle 100 and the lever arm 111 normally maintains the lever arm 111 away from the actuating arm 112 and also maintains the lever arm 110 in engagement with the rod 101.

A further alternative embodiment is illustrated schematically in FIG. 5 and includes a handle 150 and a rod 151 fixedly mounted on the handle. A bracket 152 is fixed to the rod 151 and mounts one end 155 of a line 156. The other end 157 of the line 156 is secured to the lever arm 160 of an L-shaped lever 161. The line 156 may be wire or a rod as preferred. The lever 161 has a lever arm 162 which is normally retained away from the actuating arm 165 of the limit switch 166 by means of compression spring 167 received between the handle 150 and the lever arm 162. When the rod 151 bends, however, the line 156 pivots the lever 161 about the axis 167 and causes the lever arm 162 to depress the actuating arm 165. In other respects, the embodiment of FIG. 5 operates identically to the above described embodiments.

In FIG. 6, there is illustrated still a further embodiment including the rod 200 fixedly mounted upon a handle 201. The bracket 202 mounts one end 205 of the line 206, the other end 207 of which is secured to the lever 210 pivoted to the handle 201 about the axis 211. The spring 212 received between the handle 201 and the lever arm 215 normally maintains the switch 216 unactuated but can yield to permit depression of the actuating arm 217 of the switch when the rod 200 bends. In other respects, the embodiment of FIG. 6 is similar or identical to the above described embodiments.

When fully automatic operation is not desired, the motor may be controlled by manually operating a suitably located switch with the thumb or a finger.

It will be evident from the above description that the present invention provides an improved power driven fishing reel arrangement which is relatively light and easy to use and which does not require the learning of new skills by the fisherman. It will also be evident that the present invention provides a reel arrangement which relieves fatigue normally resulting from hand cranking of the reel when retrieving a fish, when reeling in free line after casting and when drawing a lure through or on the water to attract a fish.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

Examples of various modifications which might be made in the present invention are the provision of two or more batteries which are switched either in series or in parallel to provide two or more reeling speeds. Also, the type of reel used in the present invention is not critical and either a spininng reel or a spool type reel can be used. The motor of the present invention may also be arranged at various angles and positions.

The invention claimed is:

1. A fishing reel arrangement comprising a rod, a reel mounted on said rod, a motor mounted on said rod and coupled to said reel for the rotation thereof, switch means for controlling power to said motor, and means for sensing the bending of said rod and for actuating said switch means to turn off said motor when said rod bends a predetermined amount.

2. A fishing reel arrangement comprising a rod, a reel mounted on said rod, a motor mounted on said rod, first one-way clutch means coupling said motor to said reel whereby said reel can be rotated in one direction by said motor or without rotation of said motor, a crank, second one-way clutch means coupling said crank to said reel and arranged to rotate said reel in said one direction when said crank is rotated or to permit said reel to rotate in said one direction without rotation of said crank, said second clutch means being operable to block rotation of said reel in a direction opposite to said one direction by retaining said crank stationary relative to said handle, switch means for controlling power to said motor, and means for sensing the bending of said rod and for actuating said switch means to turn off said motor when said rod bends a predetermined amount.

3. A fishing reel arrangement comprising a handle, a reel mounted on said handle, a motor mounted on said handle and coupled to said reel for the rotation thereof, switch means for controlling power to said motor, means for sensing the bending of a rod mounted on said handle and for actuating said switch means to turn off said motor when said rod bends a predetermined amount.

4. A fishing reel arrangement comprising a handle, a reel mounted on said handle, a motor mounted on said handle and coupled to said reel for the rotation thereof, switch means controlling power to said motor, a rod mounted on said handle, and means actuated by the bending of said rod for actuating said switch means to shut off said motor.

5. A fishing reel arrangement comprising a handle, a reel mounted on said handle, a motor mounted on said handle and coupled to said reel for the rotation thereof, a rod support pivotally mounted on said handle and adapted to mount a rod thereon, a switch means mounted on said handle, between said reel and a section of said rod support, and controlling power to said motor, spring means acting between said reel and rod support and yieldably preventing said rod support from actuating said switch means, said rod support being pivotal on said handle and by a laterally downward force on said rod and against the urging of said spring to actuate said switch means.

6. A fishing reel arrangement comprising a handle, a reel mounted on said handle, a motor mounted on said handle, a one-way clutch coupling said motor to said reel whereby said reel can be rotated in one direction by said motor or without rotation of said motor, a rod pivotally mounted on said handle, switch means mounted on said handle, between said reel and a section of said rod, and controlling power to said motor, spring means acting between said reel and rod and yieldably preventing said rod from actuating said switch means, said rod being pivotal as a result of a laterally downward force on said rod against the urging of said spring to actuate said switch means, a crank, one-way clutch means coupling said crank to said reel, said last mentioned one-way clutch means being arranged to rotate said reel in said one direction when said crank is rotated or to permit said reel to rotate in said one direction without rotation of said crank.

7. A fishing reel arrangement comprising a handle, a reel mounted on said handle, a motor mounted on said handle and coupled to the reel for the rotation thereof, a line secured to the reel, switch means for controlling power to the motor, means for sensing the bending of a rod mounted on said handle and for actuating said switch means to turn off said motor when said rod bends a predetermined amount and for actuating said switch means to turn on said motor when said rod straightens a predetermined amount.

8. A fishing reel arrangement comprising a rod, a reel mounted on said rod, a motor mounted on said rod and coupled to said reel for rotation thereof, and means actuated by the straightening of said rod for applying power to said motor and actuated by the bending of said rod for removing power from said motor.

9. A fishing reel arrangement comprising a rod, a reel mounted on said rod, a motor mounted on said rod and coupled to said reel for the rotation thereof, switch means for controlling power to said motor, and means for sensing the exertion of a laterally downward force on said rod and for actuating said switch means to turn off said motor when said force reaches a predetermined magnitude.

References Cited by the Examiner
UNITED STATES PATENTS

| | | | |
|---|---|---|---|
| 2,470,507 | 5/1949 | Luton et al. | 43—21 X |
| 3,030,046 | 4/1962 | Moghadam | 43—21 X |

ANTONIO F. GUIDA, *Acting Primary Examiner.*

SAMUEL KOREN, ABRAHAM G. STONE, *Examiners.*

R. L. HOLLISTER, *Assistant Examiner.*